US010335690B2

(12) United States Patent
Schleicher

(10) Patent No.: US 10,335,690 B2
(45) Date of Patent: Jul. 2, 2019

(54) AUTOMATIC VIDEO GAME HIGHLIGHT REEL

(71) Applicant: Microsoft Technology Licensing, LLC, Redmond, WA (US)

(72) Inventor: John Schleicher, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 15/268,516

(22) Filed: Sep. 16, 2016

(65) Prior Publication Data

US 2018/0078862 A1 Mar. 22, 2018

(51) Int. Cl.
| | |
|---|---|
| *A63F 9/24* | (2006.01) |
| *A63F 13/86* | (2014.01) |
| *A63F 13/67* | (2014.01) |
| *H04N 21/442* | (2011.01) |
| *H04N 21/478* | (2011.01) |
| *H04N 21/845* | (2011.01) |
| *H04N 21/8549* | (2011.01) |
| *G11B 27/031* | (2006.01) |
| *A63F 13/79* | (2014.01) |

(Continued)

(52) U.S. Cl.
CPC .............. *A63F 13/86* (2014.09); *A63F 13/67* (2014.09); *G11B 27/031* (2013.01); *H04N 21/44218* (2013.01); *H04N 21/4781* (2013.01); *H04N 21/8456* (2013.01); *H04N 21/8549* (2013.01); *A63F 13/35* (2014.09); *A63F 13/79* (2014.09); *H04N 21/42201* (2013.01)

(58) Field of Classification Search
USPC .................................................... 463/25–43
See application file for complete search history.

(56) References Cited

U.S. PATENT DOCUMENTS

| | | | | |
|---|---|---|---|---|
| 5,778,137 A | * | 7/1998 | Nielsen | ............. G06F 17/30843 386/239 |
| 9,055,196 B2 | * | 6/2015 | Hyun | ................ G06F 17/30781 |
| 9,199,165 B2 | * | 12/2015 | Zahn | .................. H04N 21/4781 |

(Continued)

FOREIGN PATENT DOCUMENTS

CN 102427507 A 4/2012

OTHER PUBLICATIONS

Hornyak, Tim, "Graava Action Cam Automatically Finds Best Clips", Available at: <<http://www.pcworld.idg.com.au/article/581342/graava-action-cam-automatically-finds-best-clips/>>, Aug. 6, 2015, 7 pages.

(Continued)

*Primary Examiner* — Masud Ahmed
(74) *Attorney, Agent, or Firm* — Klarquist Sparkman, LLP

(57) ABSTRACT

In one example, a gaming platform may use a variety of protocols to identify video game events for inclusion in a highlight reel. The gaming platform may store a highlight criterion for a video game to mark a highlight event in the video game. The gaming platform may play a video game session of the video game. The gaming platform may identify a video game event in the video game session that matches the highlight criterion. The gaming platform may trigger an application programming interface to mark the video game event as a highlight event for inclusion in a highlight reel presenting highlight events from the video game session. The gaming platform may present the video game session to a player.

20 Claims, 14 Drawing Sheets

(51) Int. Cl.
*A63F 13/35* (2014.01)
*H04N 21/422* (2011.01)

(56) References Cited

U.S. PATENT DOCUMENTS

| | | | | |
|---|---|---|---|---|
| 9,233,305 B2* | 1/2016 | Laakkonen | | A63F 13/10 |
| 2009/0132924 A1* | 5/2009 | Vasa | | G11B 27/105 |
| | | | | 715/723 |
| 2009/0208181 A1* | 8/2009 | Cottrell | | G11B 27/034 |
| | | | | 386/278 |
| 2011/0173235 A1* | 7/2011 | Aman | | A63B 24/0021 |
| | | | | 707/792 |
| 2012/0189273 A1* | 7/2012 | Folgner | | H04N 9/8227 |
| | | | | 386/241 |
| 2013/0226983 A1* | 8/2013 | Beining | | H04N 21/252 |
| | | | | 709/201 |
| 2015/0141140 A1* | 5/2015 | Lampe | | G11B 27/031 |
| | | | | 463/31 |
| 2015/0222919 A1* | 8/2015 | Licata | | H04N 19/513 |
| | | | | 375/240.16 |
| 2015/0312652 A1* | 10/2015 | Baker | | H04N 21/8549 |
| | | | | 386/281 |
| 2016/0361646 A1* | 12/2016 | Perry | | A63F 13/355 |
| 2018/0280802 A1* | 10/2018 | Stroud | | A63F 13/355 |

OTHER PUBLICATIONS

"Create highlight clips", Available at: <<https://support.google.com/youtube/answer/4522163?hl=en>>, Retrieved on: Jun. 27, 2016, 2 pages.

Kolekar, et al., "Event-Importance Based Customized and Automatic Cricket Highlight Generation", In Proceedings of IEEE International Conference on Multimedia and Expo, Jul. 9, 2006, pp. 1617-1620.

* cited by examiner

500

600

AUTOMATIC VIDEO GAME HIGHLIGHT REEL

BACKGROUND

While in the past video games used to be localized, gaming has expanded into a more communal experience. A video game platform may be connected via a network to a game server. The game server may provide a user with access to the video game via download, providing a greater range of video games than available at a physical store. Further, by connecting to the game server during game play, multiple users at multiple physical locations may interact in the same virtual environment. Even if a user is not available at the same time to be present during the game play, the player may record the game play for later experience by other users.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to using a variety of protocols to identify video game events for inclusion in a highlight reel. The gaming platform may store a highlight criterion for a video game to mark a highlight event in the video game. The gaming platform may play a video game session of the video game. The gaming platform may identify a video game event in the video game session that matches the highlight criterion. The gaming platform may trigger an application programming interface to mark the video game event as a highlight event for inclusion in a highlight reel presenting highlight events from the video game session. The gaming platform may present the video game session to a player.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Figure 1:
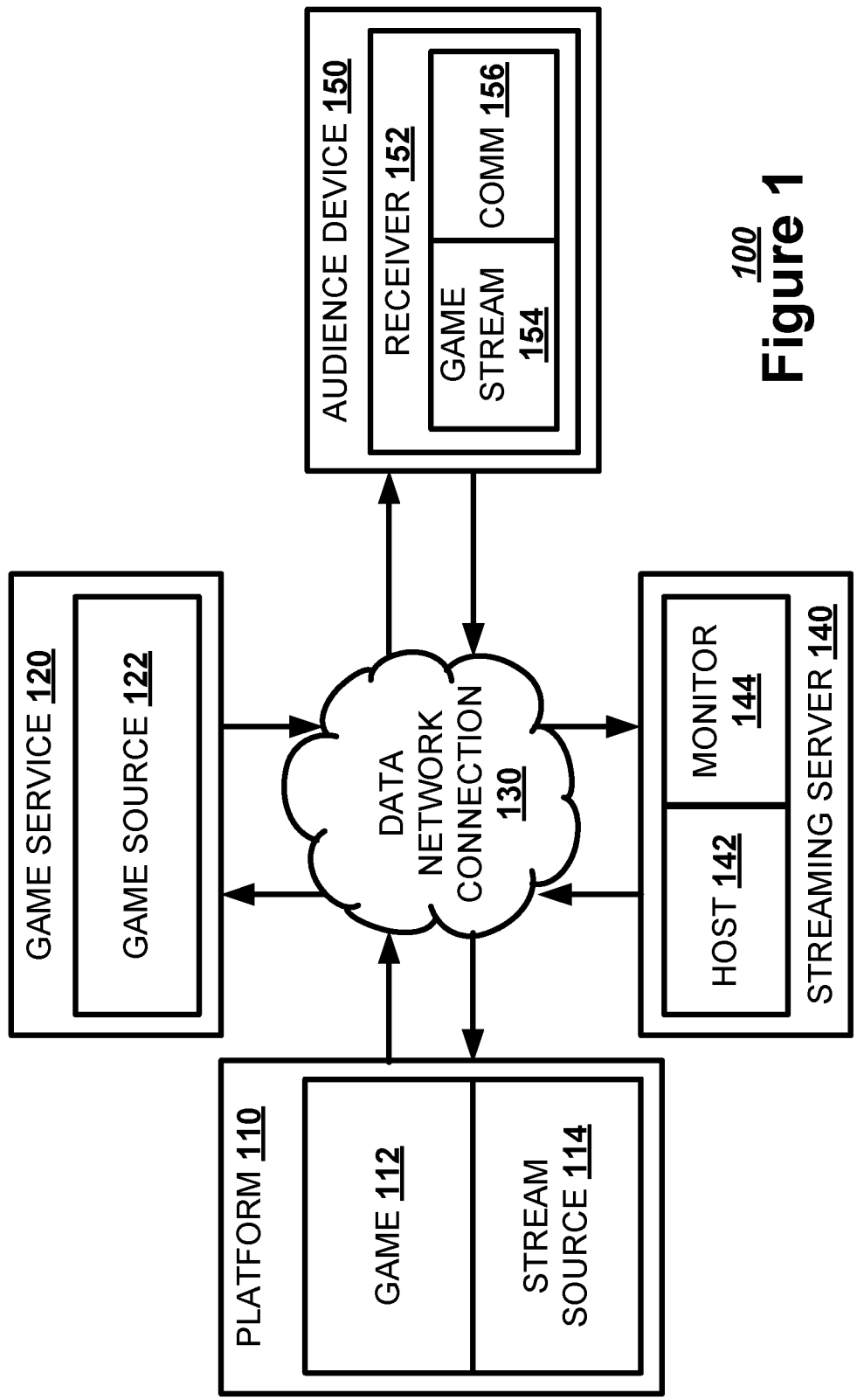
FIG. 1 illustrates, in a block diagram, one example of a gaming network.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a video game recording system, a computing device, or a machine-implemented method.

In one example, a gaming platform may use a variety of protocols to identify video game events for inclusion in a highlight reel. The gaming platform may store a highlight criterion for a video game to mark a highlight event in the video game. The gaming platform may play a video game session of the video game. The gaming platform may identify a video game event in the video game session that matches the highlight criterion. The gaming platform may trigger an application programming interface to mark the video game event as a highlight event for inclusion in a highlight reel presenting highlight events from the video game session. The gaming platform may present the video game session to a player.

Players streaming or recording video games may record many hours of footage. In order to entice more viewers, a player may make a highlight reel of the most exciting segments. Sifting through the available footage may result in a significant expenditure by the player of time that may be better spent playing the video game.

In order to create an automatic highlight reel, the gaming platform may automatically identify interesting segments. The gaming platform may use multiple approaches to identify interesting video game events. A game developer may access an application programming interface to flag a section of game footage as interesting in real time in order to facilitate highlighting that section of the recording later. For example, in League of Legends®, the gaming platform may call an application programming interface to list the time since the beginning of the first kill to highlight from that time until the present.

Additionally, streaming a video game session may provide an alternative metric for identifying highlight events. The gaming platform may use metadata describing actions of a video game audience device set indicating audience interaction with a game session stream of the game to identify highlight events. The gaming platform may quantify audience interaction using the number of comments posted per a set period of time on a comment module or on social media using a game session stream identifier. Further, often the player may record the reactions of the player to the game to accompany any game stream. The gaming platform may analyze the actions and facial expressions of the player in the recording to identify highlight events.

The gaming platform may leverage new technologies for user input to infer gaming events of importance to the player, such as gesture capture technology. In gesture capture technology, the gaming platform may monitor the physical actions of the user to determine the responsive actions of the avatar of the player in the game environment. Additionally, voice commands and comments of the user during the game may be used to determine levels of player excitement. The gaming platform may quantify player excitement using a biometric characteristic captured from a biometric input to the user interface to determine video game events of interest. A biometric input is an input that includes an identifying characteristic based on a biological feature of the user.

FIG. 1 illustrates, in a block diagram, one example of a gaming network. A game platform 110 may execute an interactive video game 112 for a player. The game platform 110 may be a desktop computer, a game console, a smart phone, a tablet, a smart watch, or other computing device capable of executing an interactive video game 112. The game platform 110 may connect to a game service 120 via a data network connection 130. The game service 120 may be one or more servers executing a game source 122. The data network connection 130 may be an internet connection, a wide area network connection, a local area network connection, a mobile telephone network, or other type of data network connection. The game platform 110 may download the interactive video game 112 from the game source 122. Further, the game source 122 may allow the game platform to play a multiplayer game across the data network connection 130.

The game platform 110 may execute a stream source 114 to access a streaming server 140 executing a streaming host 142. The streaming host 142 may connect to a video game audience member device 150 of the video game audience device set executing a streaming receiver 152. The streaming source 114 may broadcast the video game 112 to the video game audience member device 150 as a game stream 154. The streaming receiver 152 may present the game stream 154 to the audience member. The streaming receiver 152 may provide a communication panel 156 to allow the audience member to provide comments on the game stream 154.

The streaming server 140 may execute a monitor application module 144 to gauge the reaction of the audience member to the performance of the video game 112. The monitor application module 144 may measure the number of communications associated with the game stream 154. For example, the monitor application module 144 may tally the number of comments an audience member posts in a communication panel 156 in a given period.

Figure 2:
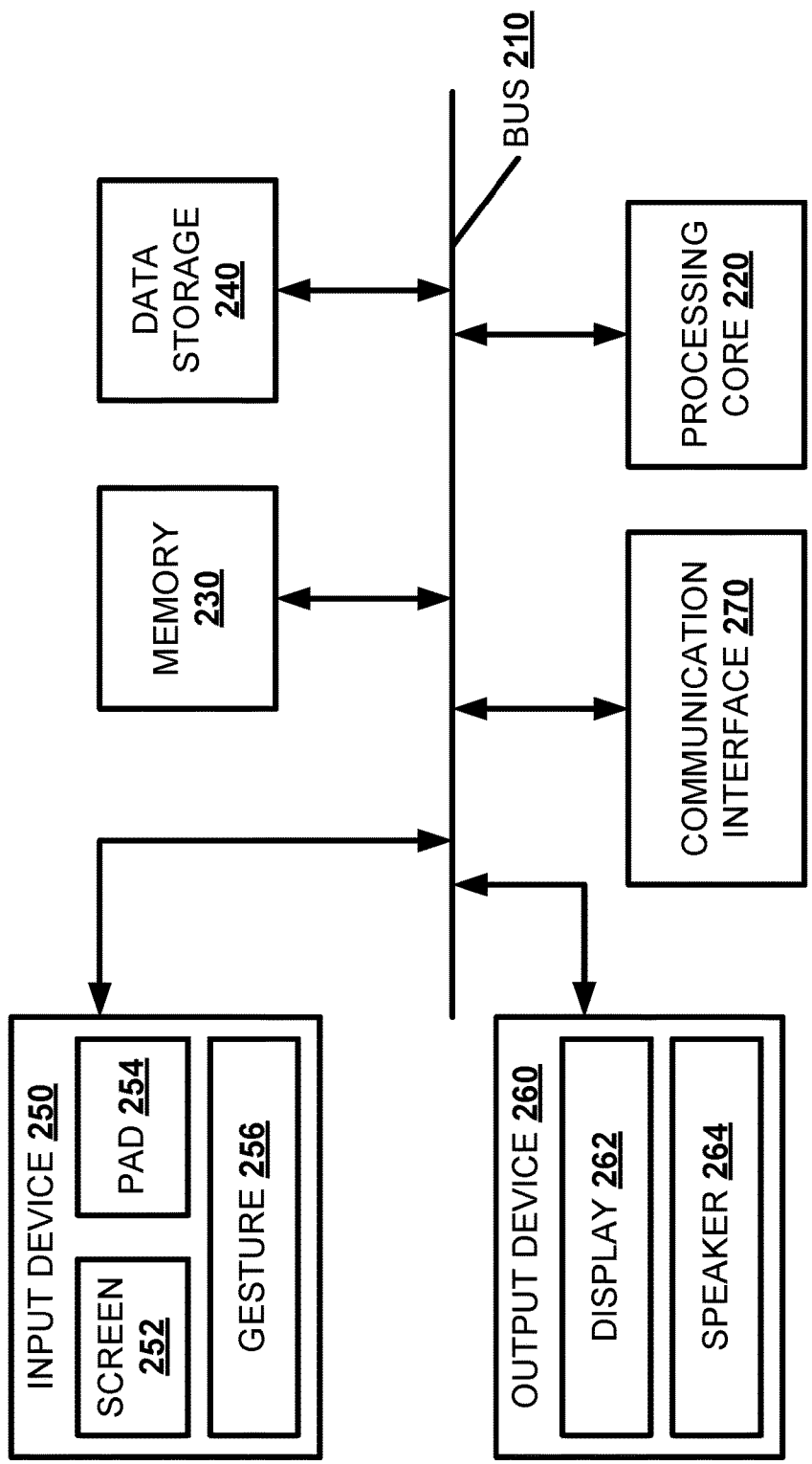
FIG. 2 illustrates, in a block diagram, one example of a computing device.

FIG. 2 illustrates a block diagram of an exemplary computing device 200 which may be configured to act as a video game recording system. The computing device 200 may combine one or more of hardware, software, firmware, and system-on-a-chip technology to implement a video game recording system. The computing device 200 may include a bus 210, a processing core 220, a memory 230, a data storage 240, an input device 250, an output device 260, and a communication interface 270. The bus 210, or other component interconnection, may permit communication among the components of the computing device 200.

The processing core 220 may include at least one conventional processor or microprocessor that interprets and executes a set of instructions. The processing core 220 may play a video game session of a video game. The processing core 220 may identify a video game event in the video game session that matches a highlight criterion. The processing core 220 may trigger an application programming interface to mark the video game event as a highlight event for inclusion in a highlight reel presenting highlight events from the video game session. The processing core 220 may collect the highlight event from a recording of the video game session.

The processing core 220 may assign a relevancy rating to the highlight event based on the highlight criterion. The processing core 220 may set a reel threshold for the highlight reel based on at least one of a reel length and an event quantity of the highlight reel. The processing core 220 may compare the relevancy rating for the highlight event to the reel threshold for the highlight reel. The processing core 220 may discard an event recording of the highlight event based on a relevancy rating for the highlight event.

The processing core 220 may compare an audience interaction level for a video game stream of the video game session to an event threshold. The processing core 220 may mark the video game event as the highlight event for inclusion in the highlight reel presenting highlight events from the video game session based on an event threshold. The processing core 220 may set the relevancy rating for the highlight event based on an audience interaction level from a video game audience with a video game stream of the video game session. The processing core 220 may record a player interaction with the video game session. The processing core 220 may prioritize an explicit highlight event for inclusion in the highlight reel.

The memory 230 may be a random access memory (RAM) or another type of dynamic data storage that stores information and instructions for execution by the processing core 220. The memory 230 may also store temporary variables or other intermediate information used during execution of instructions by the processing core 220. The memory 230 may store a highlight criterion for a video game to mark a highlight event in the video game. The highlight criterion may identify at least one of a highlight start point and a highlight endpoint. The memory 230 may store a recording of the video game session. The memory 230 may record the highlight event according to the highlight criterion during the video game session. The memory 230 may record a player interaction with the video game session.

The data storage 240 may include a conventional ROM device or another type of static data storage that stores static information and instructions for the processing core 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing a highlight criterion.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The input device 250 may monitor a biometric characteristic of a player interaction to determine a player excitement level to set a relevancy rating for the highlight event. The input device 250 may receive a highlight input, such as a start highlight input or an end highlight input, to mark the video game event as an explicit highlight event for inclusion in the highlight reel. The output device 260 may include one or more conventional mechanisms that output information to the user, including a display screen 262, a printer, one or more speakers 264, a headset, a vibrator, or a medium, such as a memory, or a magnetic or optical disk and a corresponding disk drive. The output device 250 may present the video game session to a player.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may access a game service and to stream the video game session to a video game audience device set.

The computing device 200 may perform such functions in response to processing core 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
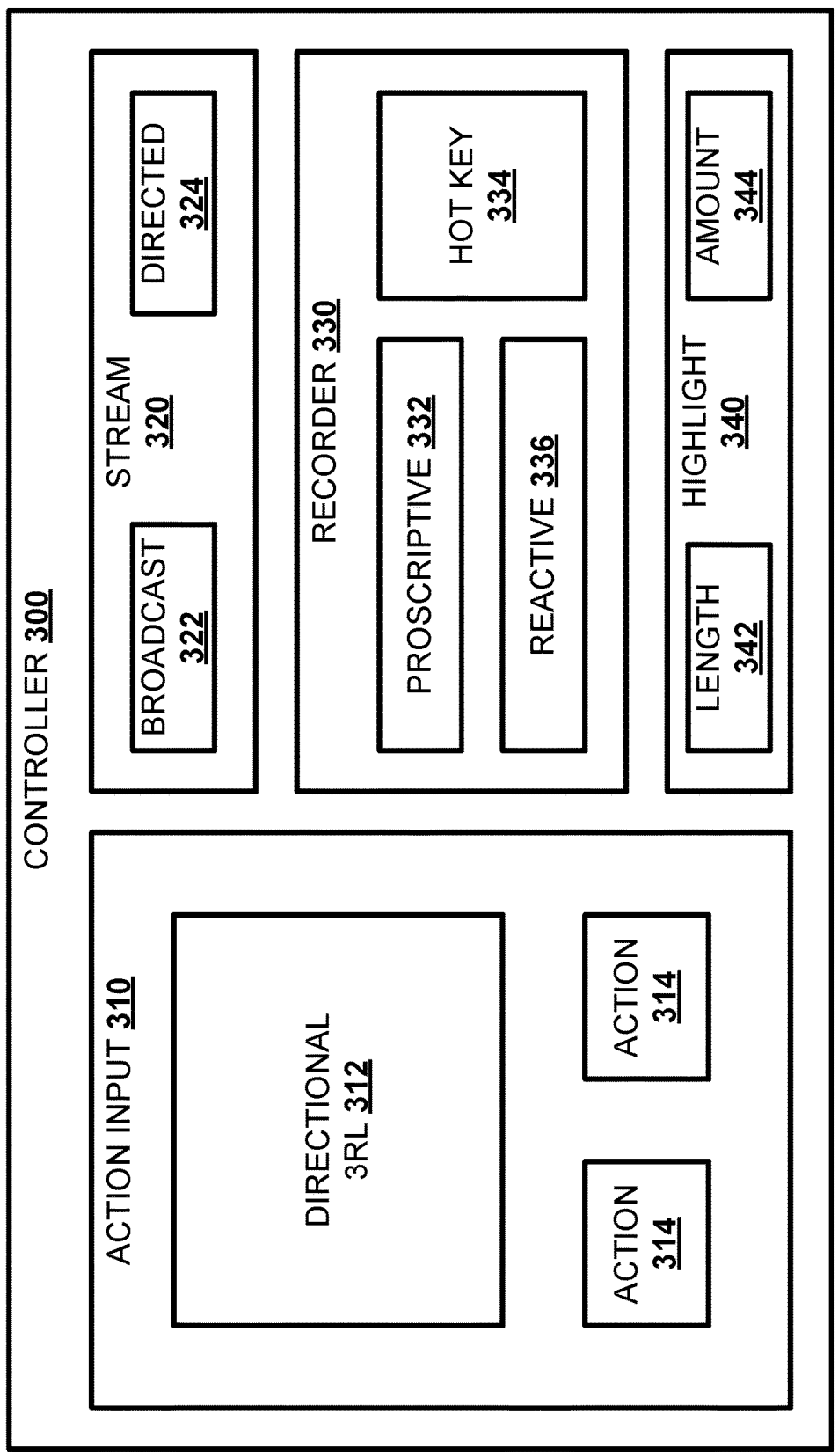
FIG. 3 illustrates, in a block diagram, one example of a video game control.

FIG. 3 illustrates, in a block diagram, one example of a video game control 300. The video game control 300 may be a virtual control presented on a touchscreen or a physical control, such as a gamepad. The video game control 300 may have an action input panel 310 to interact with a gaming environment of the game. The action input panel 310 may have a directional control 312 used to directionally move a gamer avatar representing the player in the gaming environment, such as a joystick or a touchpad. The action input panel 310 may have an action button 314, either physical or virtual, to direct the gamer avatar to perform a game-specific action.

The video game control 300 may have a streaming panel 320 to live stream a video game session to a video game audience device set. The streaming panel 320 may have a broadcast input 322 to broadcast the live stream to an unrestricted audience. The streaming panel 320 may have a directed input 324 to transmit the live stream to a specific video game audience member device.

The video game control 300 may have a recorder panel 330 to selectively record a video game session. The recorder panel 330 may have a proscriptive recording input 332 to place the game in proscriptive recording mode. In proscriptive recording mode, the video game platform may begin recording a video game event in the video game session upon activation of a hot key 334. The recorder panel 330 may have a reactive recording input 336 to place the game in reactive recording mode. In reactive recording mode, the video game platform may to keep a running recording of a video game session in a buffer. Upon activation of the hot key 334, the video game platform may retain a preset amount of the running recording.

The video game control 300 may have a highlight reel panel 340 to automatically generate a highlight reel for the video game session. The highlight reel panel 340 may have a length input 342 to select highlights for the highlight reel based on the length of the highlight reel. The highlight reel panel 340 may have an amount input 342 to select the highlights for the highlight reel based on the number of highlights.

Figure 4:
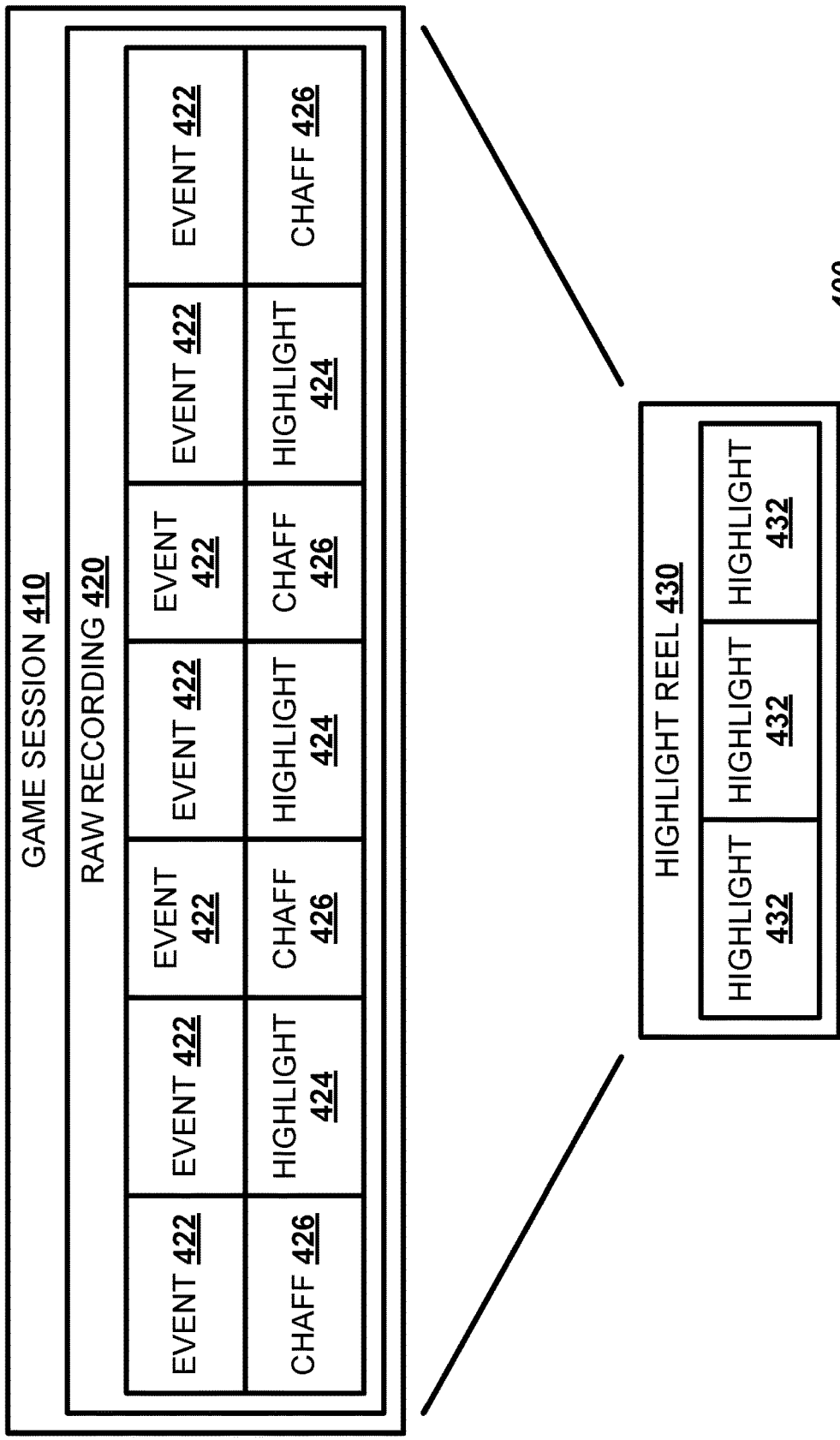
FIG. 4 illustrates, in a block diagram, one example of generating a highlight reel.

FIG. 4 illustrates, in a block diagram, one example of generating a highlight reel 400. A player may play a video game for a video game session 410. The video game platform may record the video game session 410, producing a raw recording 420 of a series of events 422. The video game platform may divide the events 422 of the raw recording 420 into highlights 424 and chaff 426. A highlight 424 is an event 422 that the player wants to show to other users. Chaff 426 is an event 422 that the player is uninterested in showing. The video game platform may distill the raw recording 420 to a highlight reel 430 having highlights 432 without the chaff 426.

Figure 5:
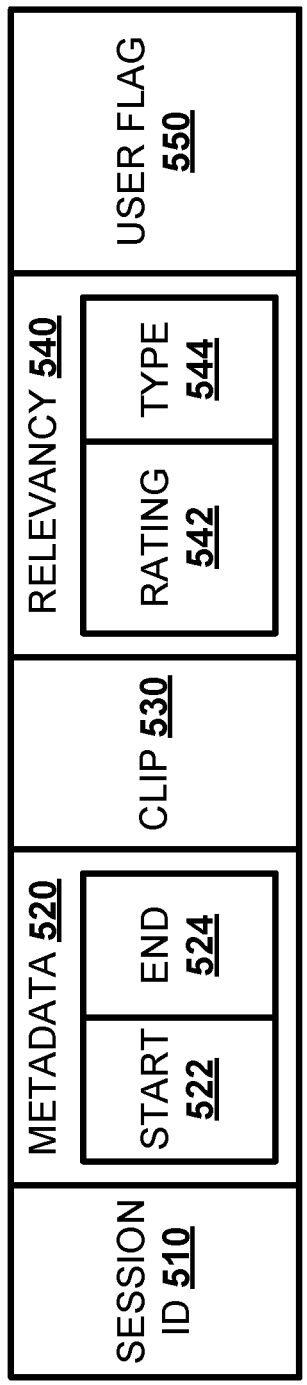
FIG. 5 illustrates, in a block diagram, one example of a game event record.

FIG. 5 illustrates, in a block diagram, one example of a game event record 500. The game event record 500 may describe a highlight recorded from the video game session. The game event record 500 may have a session identifier 510 identifying the video game session during which the video game platform recorded the highlight. The game event record 500 may have a metadata field 520 describing the highlight. The metadata field 520 may have a start time 522 describing the start of the highlight relative to the video game session. The metadata field 520 may have an end time 524 describing the end of the highlight relative to the video game session. The game event record 500 may store a clip 530 representing the highlight.

The game event record 500 may associate a relevancy field 540 with the clip 530 of the highlight describing the relevancy of the highlight to the player. The relevancy field 540 may have a rating field 542 assigning a numerical value for the relevancy of the highlight. The relevancy field 540 may have a type field that describes the protocol for determining the rating field 542, such as by a developer defined application programming interface, a streaming audience reaction, or a biometric response from the user. The game event record 500 may have a user flag to indicate a highlight explicitly selected by the player, and thus given a higher priority over the other highlights.

Figure 6:
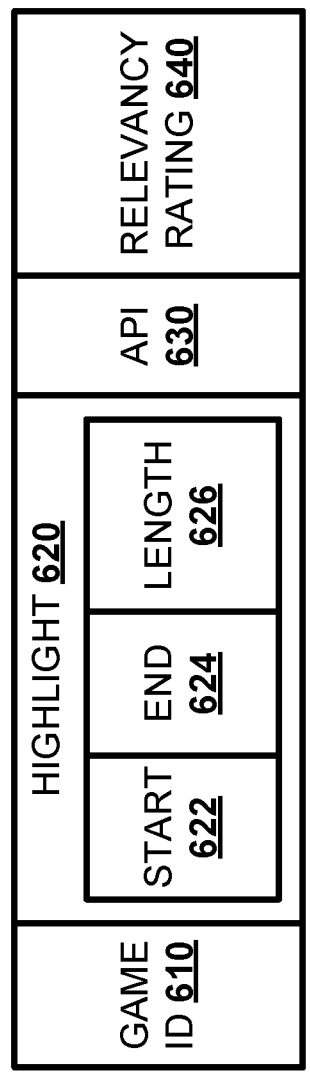
FIG. 6 illustrates, in a block diagram, one example of a highlight criterion.

FIG. 6 illustrates, in a block diagram, one example of a highlight criterion 600. The highlight criterion 600 may have a game identifier 610 indicating the game covered by the highlight criterion 600. The highlight criterion 600 may have one or more highlight parameters 620 describing a game event designated as a potential highlight event by the game developer. The highlight parameter 620 may have a start characteristic field 622 describing an in-game situation that may identify the start point of a highlight event. The highlight parameter 620 may have an end characteristic field 624 describing an in-game situation that may identify the end point of a highlight event. A single start characteristic field 622 may be associated with multiple potential end characteristic fields 624. The highlight parameter 620 may have a length field 626 describing an upper bound on the length of a highlight event. The highlight criterion 600 may have an application programming interface (API) field 630 identifying the application programming interface that the video game is to call to mark the identified highlight event.

The highlight criterion 600 may have a relevancy rating 640 assigning a comparative value to the highlight event for comparison with other highlight events. Each potential end characteristic field 624 may result in a different relevancy rating 640.

Figure 7:
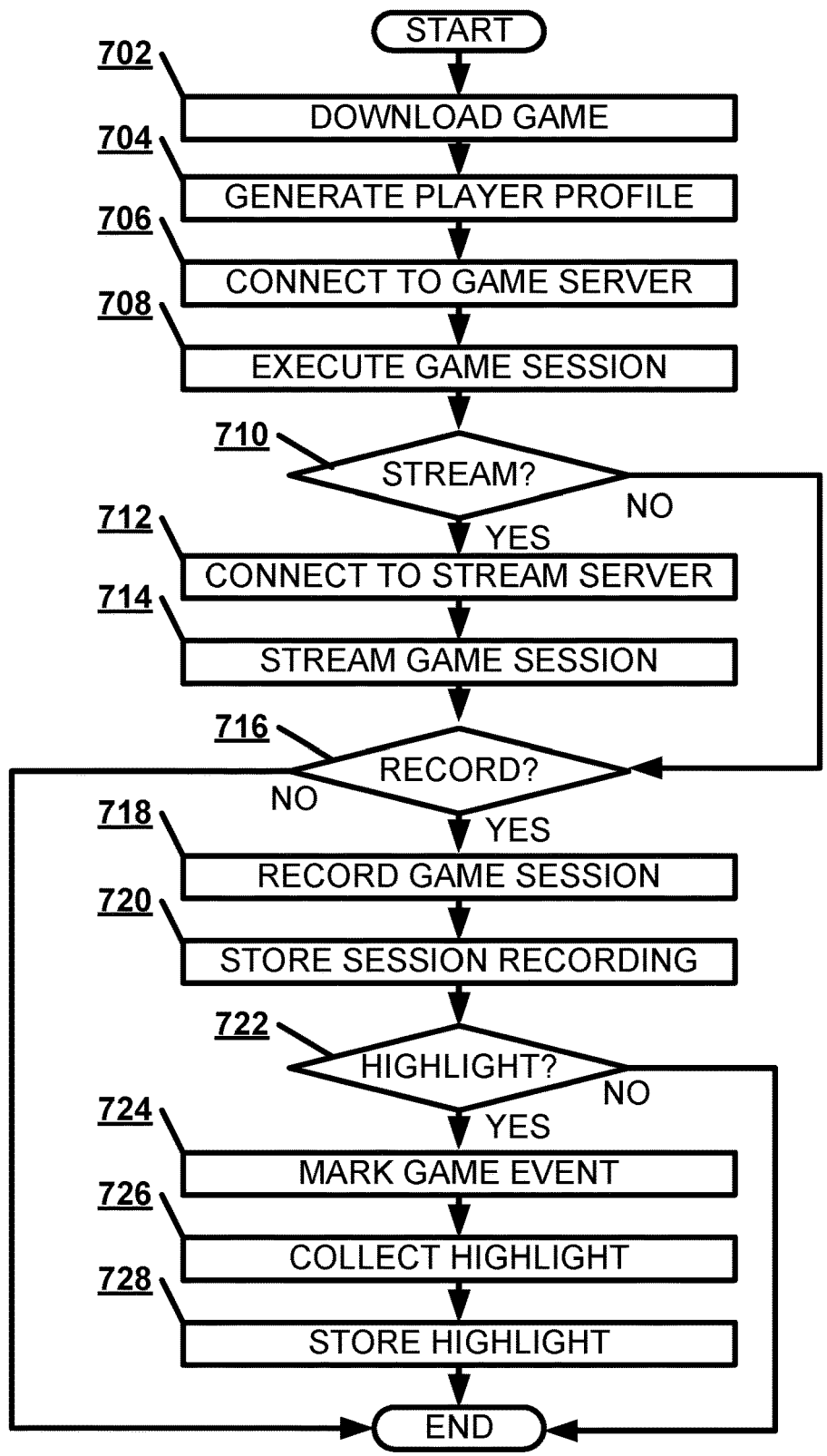
FIG. 7 illustrates, in a flowchart, one example of a method of recording a video game session.

The gaming platform may collect highlight events retroactively or proscriptively. In a retroactive collection, the gaming platform may record a significant portion of a video game session and collects the highlight events from the session at a later date. The gaming platform may still mark the highlight events in real time. FIG. 7 illustrates, in a flowchart, one example of a method 700 of recording a video game session. The gaming platform may download a video game from a game server (Block 702). The gaming platform may generate a player profile identifying the player to the game server (Block 704). The gaming platform may connect to a game server to play a single player or multiplayer game session (Block 706). The gaming platform may execute a video game session for a player (Block 708). If the player provides a stream input to the gaming platform indicating to stream his video game session (Block 710), the gaming platform may use the player profile to connect to a streaming server (Block 712). The gaming platform may stream the video game session to a video game audience device set (Block 714).

If the player provides a record input to the gaming platform to record his video game session (Block 716), the gaming platform may record the video game session (Block 718). The gaming platform may store a recording of the video game session (Block 720). If the gaming platform identifies a video game event in the video game session as a highlight event (Block 722), the gaming platform may mark the video game event as a highlight event for potential inclusion in highlight reel (Block 724). The gaming platform may collect the highlight event from the recording of the video game session (Block 726). The gaming platform may store a recording of the highlight event (Block 728).

Figure 8:
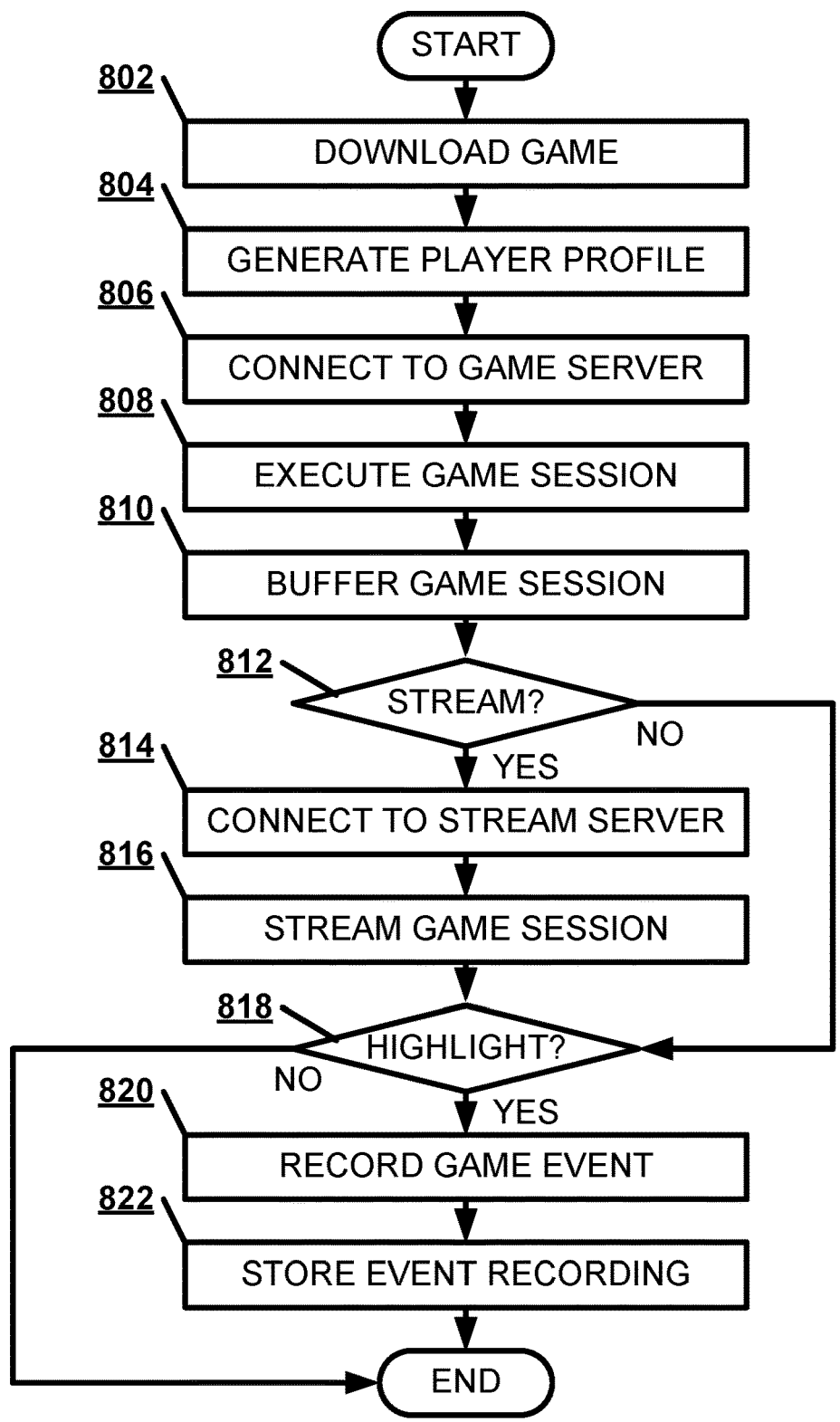
FIG. 8 illustrates, in a flowchart, one example of a method of recording a video game event.

In a proscriptive collection, the gaming platform may record the highlight events in real time, while still maintaining the ability to discard some highlight events in favor of others. FIG. 8 illustrates, in a flowchart, one example of a method 800 of recording a video game event at runtime. The gaming platform may download a video game from a game server (Block 802). The gaming platform may generate a player profile identifying the player to the game server (Block 804). The gaming platform may connect to a game server to play a single player or multiplayer game session (Block 806). The gaming platform may execute a video game session for a player (Block 808). The gaming platform may buffer a recording of the video game session for retrieval upon identification of a highlight event (Block 810). If the player provides a stream input to the gaming platform to stream his video game session (812), the gaming platform may use the player profile to connect to a streaming server (Block 814). The gaming platform may stream the video game session to a video game audience device set (Block 816). If the gaming platform identifies a video game event in the video game session as a highlight event (Block 818), the gaming platform may record the highlight event during the video game session (Block 820). The gaming platform may store a recording of the highlight event (Block 822).

Figure 9:
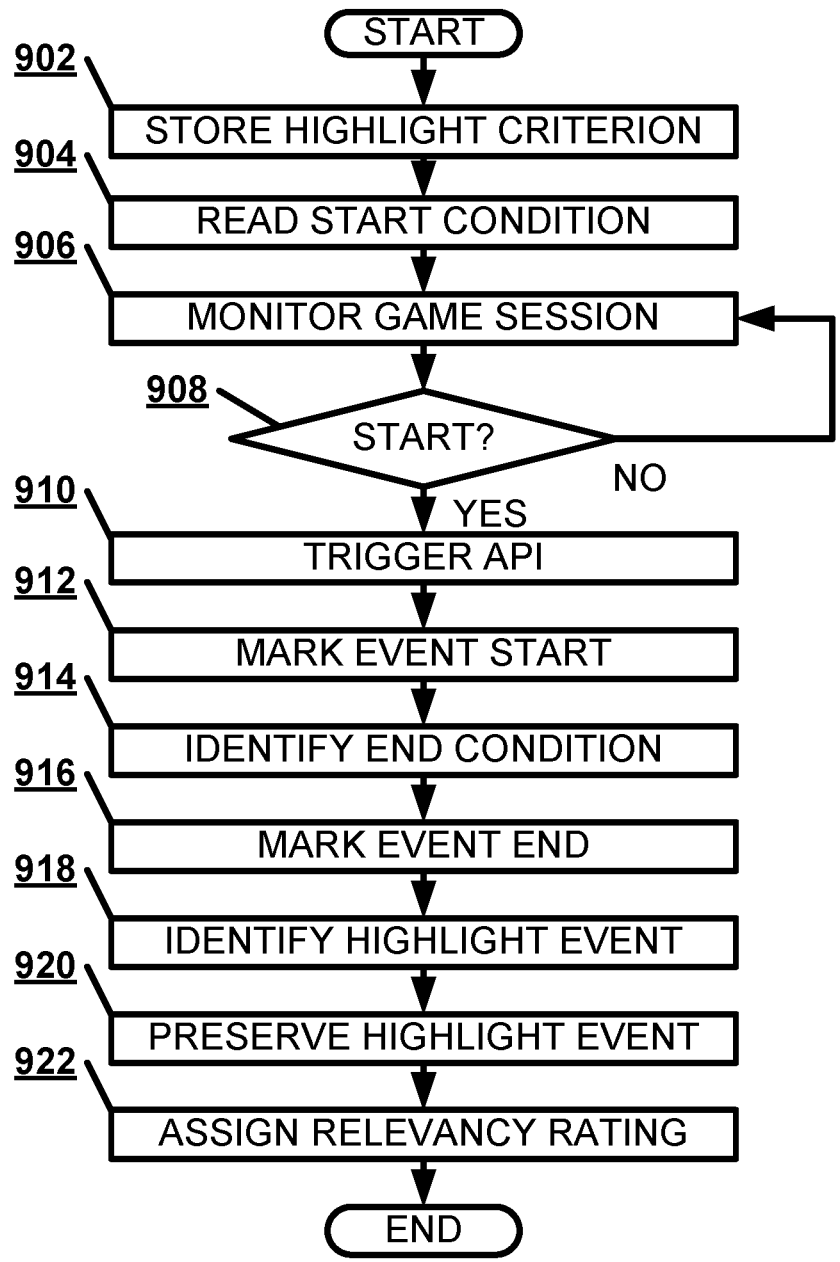
FIG. 9 illustrates, in a flowchart, one example of a method of identifying a video game event based on a highlight criterion.

FIG. 9 illustrates, in a flowchart, one example of a method 900 of identifying a video game event based on a highlight criterion. The gaming platform may store a highlight criterion for a video game to mark a highlight event in the video game (Block 902). The gaming platform may read a start point condition identified in the highlight criterion (Block 904). The gaming platform may monitor a video game session for a video game (Block 906).

If the gaming platform identifies an in-game situation that matches the start characteristic described in the highlight criterion (Block 908), the gaming platform may trigger an application programming interface to mark a video game event as a highlight event for inclusion in a highlight reel (Block 910). The gaming platform may mark the start of the video game event as a start point of a highlight event (Block 912). The gaming platform may identify an in-game situation that matches an end characteristic described in the highlight criterion (Block 914). The gaming platform mark the end of the video game event as an end point of a highlight event (Block 916).

The gaming platform may identify the video game event in the video game session that matches the highlight criterion as a highlight event (Block 918). The gaming platform may preserve the highlight event for inclusion in a highlight reel (Block 920). The gaming platform may assign a relevancy rating to the highlight event based on the highlight criterion (Block 922).

Figure 10:
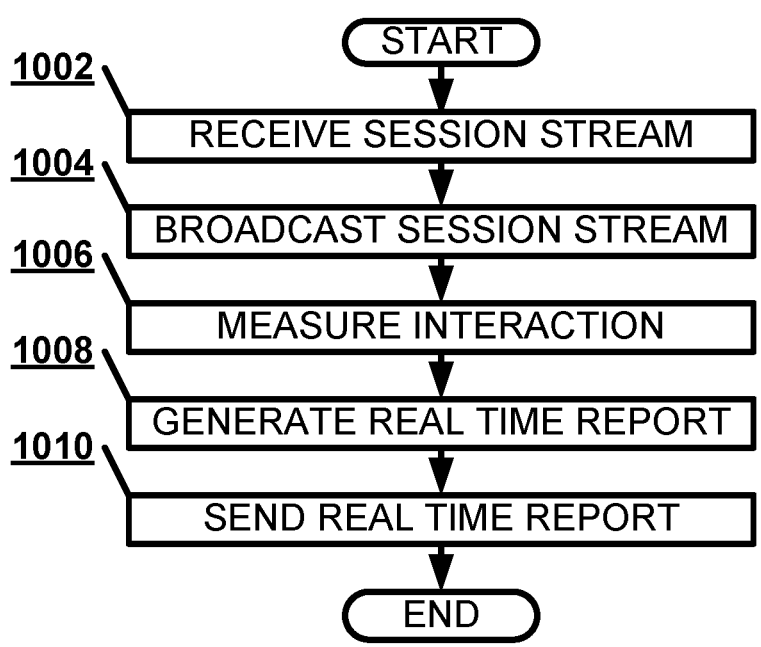
FIG. 10 illustrates, in a flowchart, one example of a method of live streaming a video game session.

Additionally, the gaming platform may diagnose an audience response to a video game event to select a video game highlight. FIG. 10 illustrates, in a flowchart, one example of a method 1000 of live streaming a video game session. The streaming server may receive a video game stream from the gaming platform (Block 1002). The streaming server may broadcast the video game stream to a video game audience device set (Block 1004). The streaming server may measure an audience interaction level from a video game audience device set with a video game stream of the video game session (Block 1006). The streaming server may generate a real-time interaction report describing the audience interaction level (Block 1008). The real-time interaction report may be a full report or a signal indicating a value representing the audience interaction level. The streaming server may send the real-time interaction report to the gaming platform (Block 1010).

Figure 11:
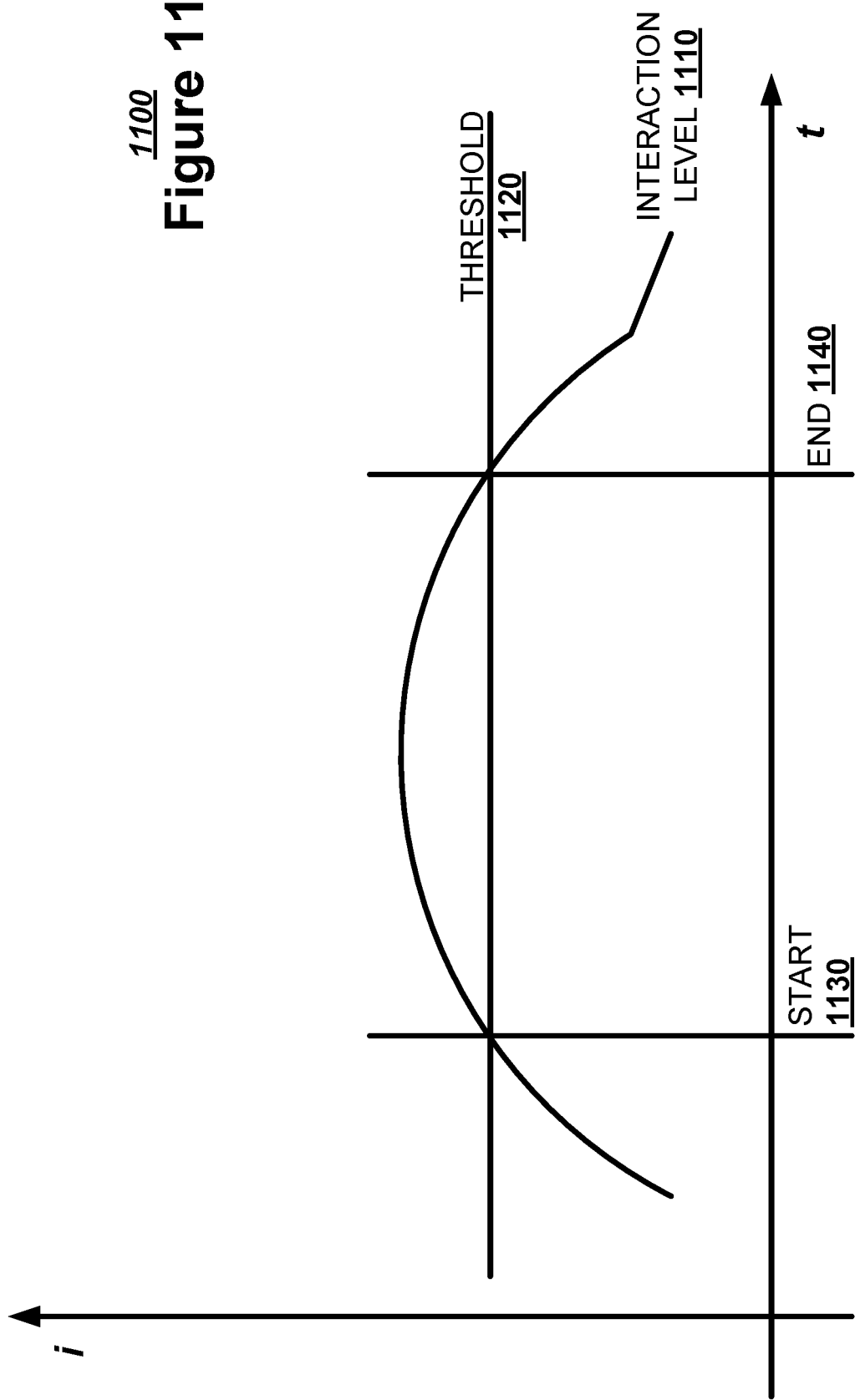
FIG. 11 illustrates, in a line graph, one example of a measurement of audience interaction.

FIG. 11 illustrates, in a line graph, one example of a measurement of audience interaction. The streaming server or the gaming platform may measure the audience interaction level 1110 based on the number of comments posted to the video game stream. Additionally, the streaming server may monitor various social media platforms to measure audience enthusiasm. For example, the video game stream may have an identifier that an audience member may incorporate as a hashtag with a posting on social media.

The gaming platform may determine an audience interaction level 1110 as a function of time. The gaming platform may compare the audience interaction level 1110 to an event threshold 1120. When the audience interaction level 1110 rises above the event threshold 1120, the gaming platform may identify a highlight start point 1130 in the video game session. When the audience interaction level 1110 falls below the event threshold 1120, the gaming platform may identify a highlight endpoint 1140 in the video game session.

Figure 12:
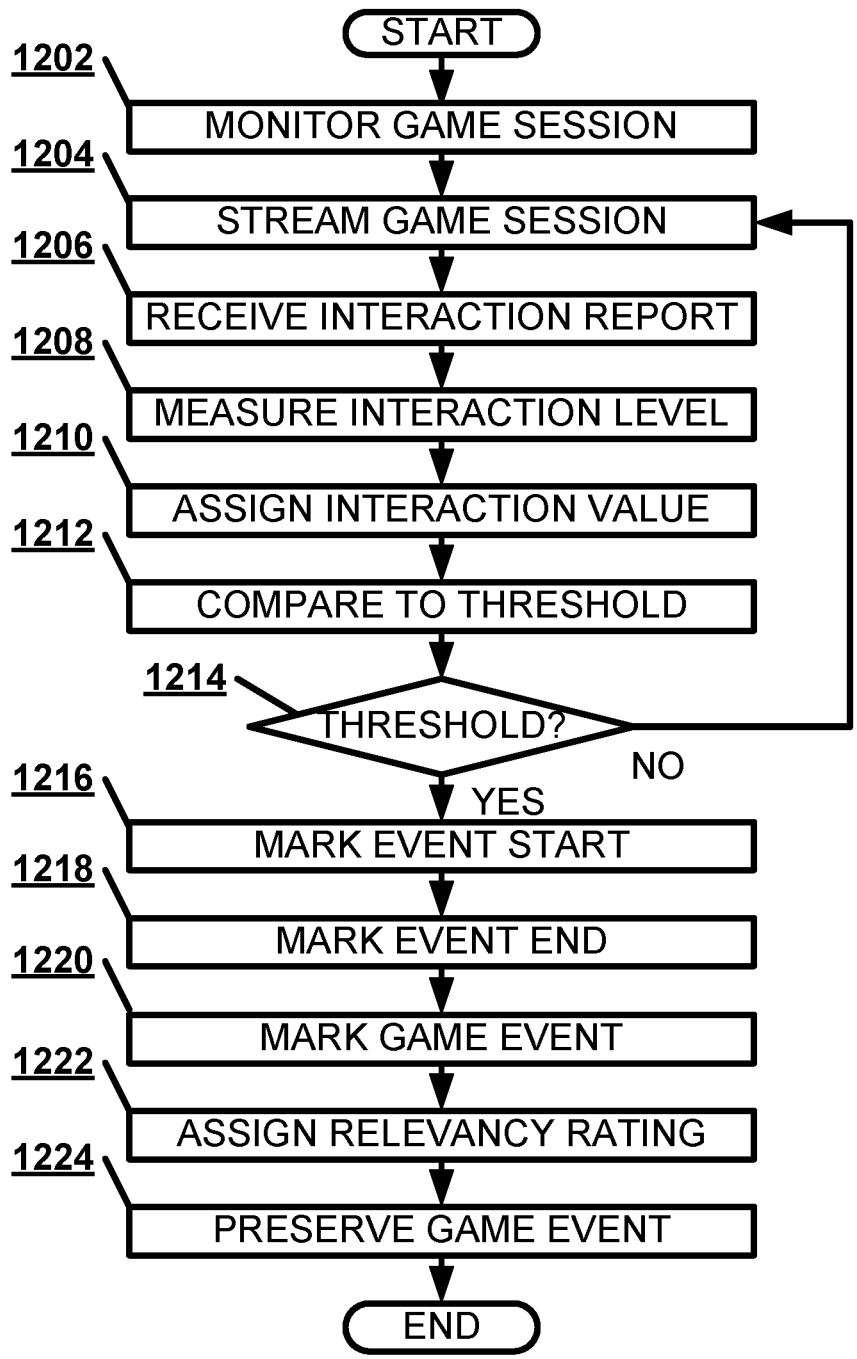
FIG. 12 illustrates, in a flowchart, one example of a method of identifying a video game event based on audience interaction.

FIG. 12 illustrates, in a flowchart, one example of a method 1200 of identifying a video game event based on audience interaction. The gaming platform may monitor a video game session for a video game (Block 1202). The gaming platform may stream a video game session to a video game audience device set (Block 1204). The gaming platform may receive a real-time interaction report describing the audience interaction level (Block 1206). The gaming platform may measure an audience interaction level from the video game audience device set describing an audience response to a video game event of the video game session (Block 1208). The gaming platform may assign an audience interaction value to the highlight event based on the audience interaction level (Block 1210).

The gaming platform may compare the audience interaction value representing the audience interaction level to an event threshold (Block 1212). If the audience interaction value is greater than an event threshold (Block 1214), the gaming platform may mark a highlight start point when the audience interaction value representing the audience interaction level is greater than the event threshold (Block 1216). The gaming platform may mark a highlight end point when the audience interaction value representing the audience interaction level is less than an audience interaction threshold (Block 1218). The gaming platform may mark the video game event as a highlight event for inclusion in a highlight reel presenting highlight events from the video game session based on the audience interaction level (Block 1220). The gaming platform may assign a relevancy rating to the highlight event based on the audience interaction level, such as averaging the audience interaction value when above the event threshold (Block 1222). The gaming platform may preserve the highlight event for inclusion in a highlight reel (Block 1224).

Figure 13:
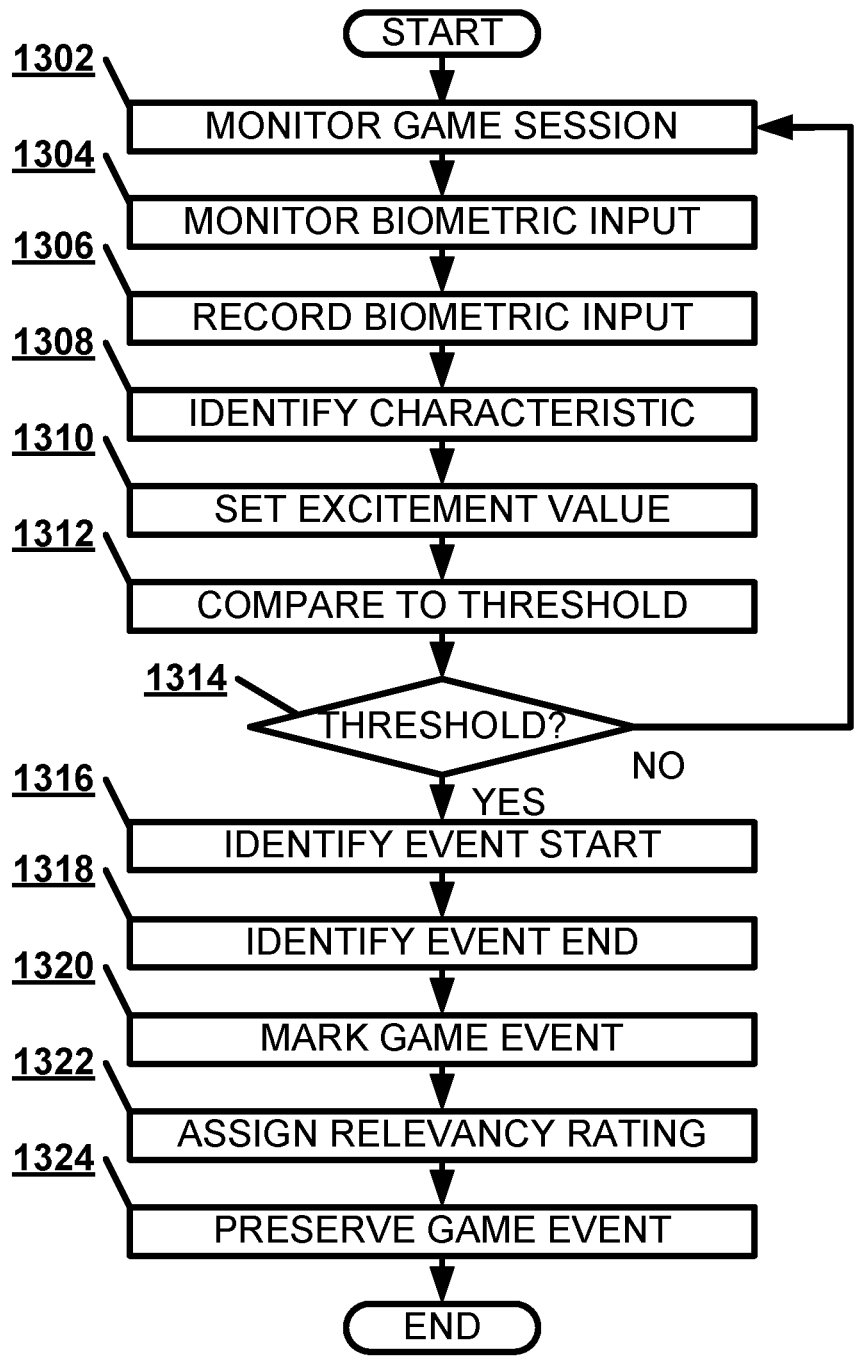
FIG. 13 illustrates, in a flowchart, one example of a method of identifying a video game event based on a biometric reaction of the player.

Additionally, the gaming platform may measure the player interaction level to identify a highlight event. FIG. 13 illustrates, in a flowchart, one example of a method 1300 of identifying a video game event based on a biometric reaction of the player. The gaming platform may monitor a video game session for a video game (Block 1302). The gaming platform may monitor a biometric input from the player during the video game session using a video camera, a biometric sensor, or a gesture recognition device (Block 1304). The gaming platform may record the biometric input entered into the video game session (Block 1306). The gaming platform may identify a biometric characteristic of a player interaction to determine a player excitement level to set an excitement value for the highlight event (Block 1308). The gaming platform generate a player excitement value representing the player excitement (Block 1310).

The gaming platform may compare the player excitement value to an event threshold (Block 1312). If the player excitement value is greater than an event threshold (Block 1314), the gaming platform may mark a highlight start point when the player excitement value is greater than an event threshold (Block 1316). The gaming platform may mark a highlight end point when the player excitement value is less than an audience interaction threshold (Block 1318). The gaming platform may mark the video game event as a highlight event for inclusion in a highlight reel presenting highlight events from the video game session based on the player excitement (Block 1320). The gaming platform may assign a relevancy rating to the highlight event based on the player excitement, such as averaging the player excitement value when above the event threshold (Block 1322). The gaming platform may preserve the highlight event for inclusion in a highlight reel (Block 1324).

Figure 14:
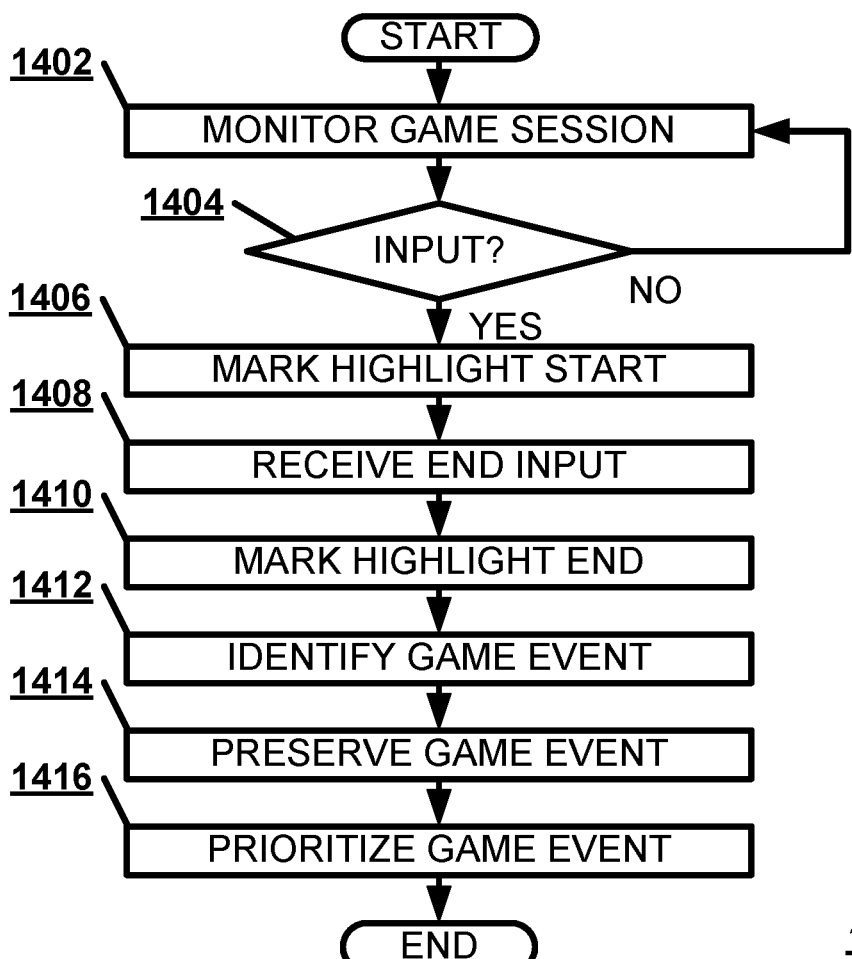
FIG. 14 illustrates, in a flowchart, one example of a method of identifying a video game event explicitly marked by the player.

Additionally, the gaming platform may identify a highlight event based on a player pressing a hot key to indicate the user indicates the video game event is a highlight event. FIG. 14 illustrates, in a flowchart, one example of a method 1400 of identifying a video game event explicitly marked by the player. The gaming platform may monitor a video game session for a video game (Block 1402). If the gaming platform receives a start highlight input to mark the video game event as an explicit highlight event for inclusion in the highlight reel (Block 1404), the gaming platform may mark a highlight start point in response to the start highlight input (Block 1406). The gaming platform may receive a stop highlight input indicating that the explicit highlight event has completed (Block 1408). The gaming platform may mark a highlight end point in response to a stop highlight input (Block 1410). The gaming platform may identify the video game event as an explicit highlight event for inclusion in a highlight reel based on the highlight input (Block 1412). The gaming platform may preserve the explicit highlight event for inclusion in a highlight reel (Block 1414). The gaming platform may prioritize an explicit highlight event for inclusion in the highlight reel (Block 1416).

Figure 15:
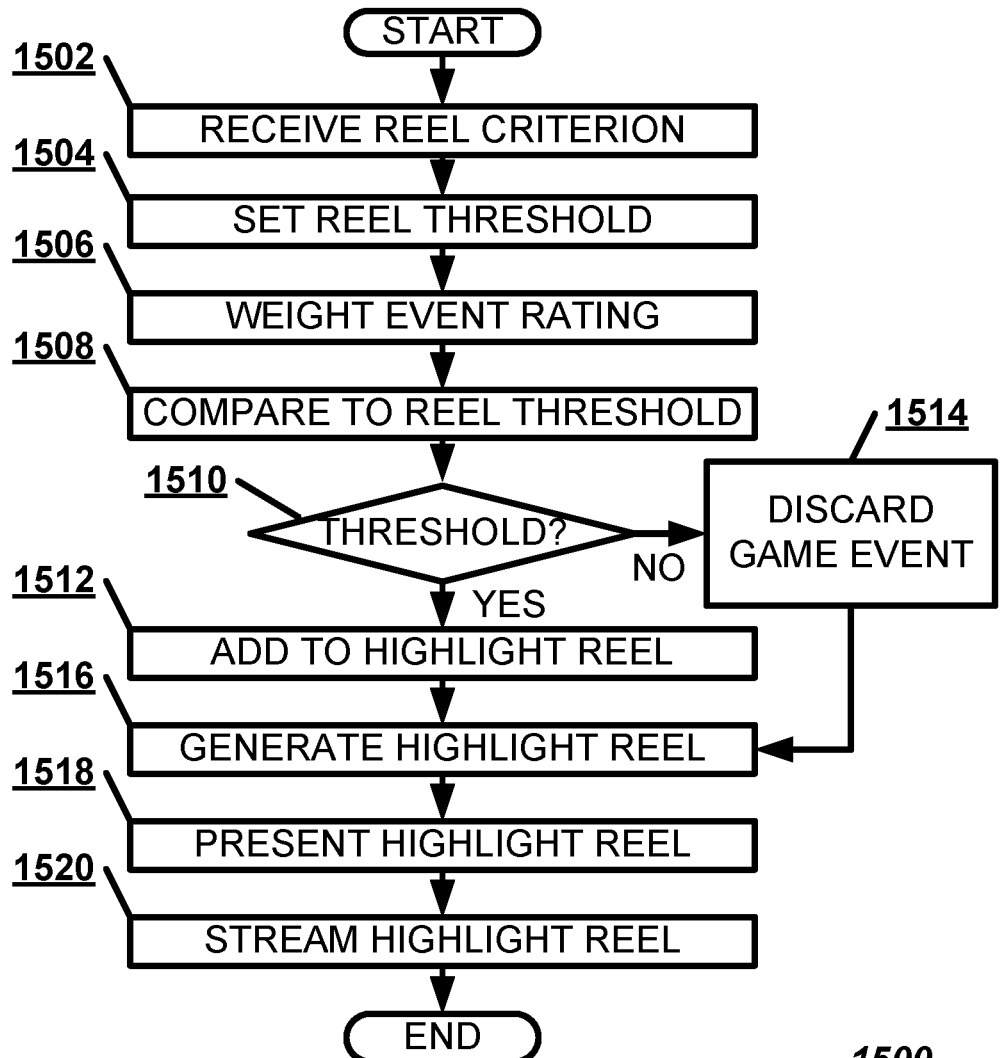
FIG. 15 illustrates, in a flowchart, one example of a method of generating a highlight reel for the video game session.

FIG. 15 illustrates, in a flowchart, one example of a method 1500 of generating a highlight reel for the video game session. The gaming platform may receive a reel criterion from a user describing at least one of a reel length or an event quantity describing the number of highlights of the highlight reel (Block 1502). The gaming platform may set a reel threshold for the highlight reel based on at least one of a reel length and an event quantity of the highlight reel (Block 1504). The gaming platform may weight a relevancy rating for a highlight event based on the selection protocol, such as user selection, player excitement, audience interaction, or highlight criterion (Block 1506). The gaming platform may compare the relevancy rating for the highlight event to a reel threshold for the highlight reel (Block 1508). If the relevancy rating is above the reel threshold (Block 1510), the gaming platform may add an event recording of the highlight event based on a relevancy rating for the highlight event (Block 1512). If the relevancy rating is below the reel threshold (Block 1510), the gaming platform may discard an event recording of the highlight event based on a relevancy rating for the highlight event (Block 1514). The gaming platform may generate a highlight reel based on the selected highlight events (Block 1516). The gaming platform may present the highlight reel to the player for review (Block 1518). The gaming platform may stream the highlight reel to the video game audience device set (Block 1520).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:

1. A video game recording system, comprising:
   memory configured to store a highlight criterion for a video game to mark a highlight event in the video game;
   a processing core having at least one processor configured to:
      execute a gaming platform to play the video game in a video game session,
      identify a video game event in the video game session that matches the highlight criterion, wherein identifying the video game event comprises:
         recording a biometric input entered into the video game session for a player interacting with the video game during the video game session, wherein said biometric input for the player is provided using a video camera, biometric sensor or gesture recognition device utilized by the player for the video game session,
         identifying a biometric characteristic of the player interacting with the video game during the video game session interaction to determine a player excitement level, and
         comparing the player excitement level to an event threshold to determine that the highlight criterion is satisfied, and
      trigger an application programming interface to mark the video game event as a highlight event for inclusion in a highlight reel presenting highlight events from the video game session; and
   an output device configured to present the video game session to a player.

2. The video game recording system of claim 1, wherein the highlight criterion identifies at least one of a highlight start point and a highlight endpoint.

3. The video game recording system of claim 1, wherein the memory is further configured to store a recording of the video game session.

4. The video game recording system of claim 1, wherein the processing core is further configured to collect the highlight event from a recording of the video game session.

5. The video game recording system of claim 1, wherein the memory is further configured to record the highlight event according to the highlight criterion during the video game session.

6. The video game recording system of claim 1, wherein the processing core is further configured to assign a relevancy rating to the highlight event based on the highlight criterion.

7. The video game recording system of claim 1, wherein the processing core is further configured to set a reel threshold for the highlight reel based on at least one of a reel length and an event quantity of the highlight reel.

8. The video game recording system of claim 1, wherein the processing core is further configured to compare a relevancy rating for the highlight event to a reel threshold for the highlight reel.

9. The video game recording system of claim 1, wherein the processing core is further configured to discard an event recording of the highlight event based on a relevancy rating for the highlight event.

10. The video game recording system of claim 1, further comprising:
    a communication interface configured to stream the video game session to a video game audience device set.

11. The video game recording system of claim 1, further comprising:
    an input device configured to receive a highlight input to mark the video game event as an explicit highlight event for inclusion in the highlight reel.

12. The video game recording system of claim 1, wherein the processing core is further configured to prioritize an explicit highlight event for inclusion in the highlight reel.

13. A computing device, having a memory to store a series of instructions that are executed by at least one processor to implement a video game recorder, the computing device configured to
    monitor a video game session for a video game executed on a video game platform;
    stream the video game session to a video game audience device set;
    measure an audience interaction level from the video game audience device set describing an audience response to a video game event of the video game session, wherein the audience interaction level is determined by measuring at least one of the following during a given time period within which the video game event occurs:
       the number of comments to a video game stream for the video game session or
       social media platform activity that is associated with the video game stream for the video game session; and
    mark the video game event as a highlight event for inclusion in a highlight reel presenting highlight events from the video game session based on the audience interaction level, wherein marking the video game event comprises:
       comparing the audience interaction level to an event threshold, marking a highlight start point when the audience interaction level exceeds an audience interaction threshold, and marking a highlight end point when the audience interaction level is less than an audience interaction threshold.

14. The computing device of claim 13, wherein the computing device is further configured to assign a relevancy rating to the highlight event based on the audience interaction level.

15. The computing device of claim 13, wherein the computing device is further configured to discard an event recording of the highlight event based on a relevancy rating for the highlight event.

16. A machine-implemented method, comprising:

monitoring a video game session for a video game executed on a video game platform;

recording a biometric input entered into the video game session for a player interacting with the video game during the video game session, wherein said biometric input for the player is provided using a video camera, biometric sensor or gesture recognition device utilized by the player for the video game session;

identifying a biometric characteristic of the player interacting with the video game during the video game session to determine a player excitement level; and marking a video game event as a highlight event for inclusion in a highlight reel presenting highlight events from the video game session based on the player excitement level, wherein marking the video game event comprises:

marking a highlight start point when the player excitement level exceeds a player excitement threshold, and marking a highlight end point when at least one of the following is below an event threshold:

the player excitement level, or an audience interaction level determined by measuring at least one of the following during a given time period within which the video game event occurs:

the number of comments to a video game stream for the video game session or social media platform activity that is associated with the video game stream for the video game session.

17. The method of claim 16, further comprising:

triggering an application programming interface to mark the video game event as a highlight event for inclusion in a highlight reel.

18. The method of claim 16, wherein marking a highlight end point when at least one of the following is below an event threshold comprises marking a highlight end point when the audience interaction level is less than an audience interaction threshold.

19. The method of claim 16, wherein marking a highlight end point when at least one of the following is below an event threshold comprises marking a highlight end point when the player excitement level is less than an audience interaction threshold.

20. The method of claim 16, further comprising assigning a relevancy rating to the highlight event based on one or more of:

the player excitement level, or the audience interaction level.

* * * * *